No. 781,822. PATENTED FEB. 7, 1905.
L. O. GOODWIN.
MULE.
APPLICATION FILED OCT. 15, 1903.
3 SHEETS—SHEET 1.
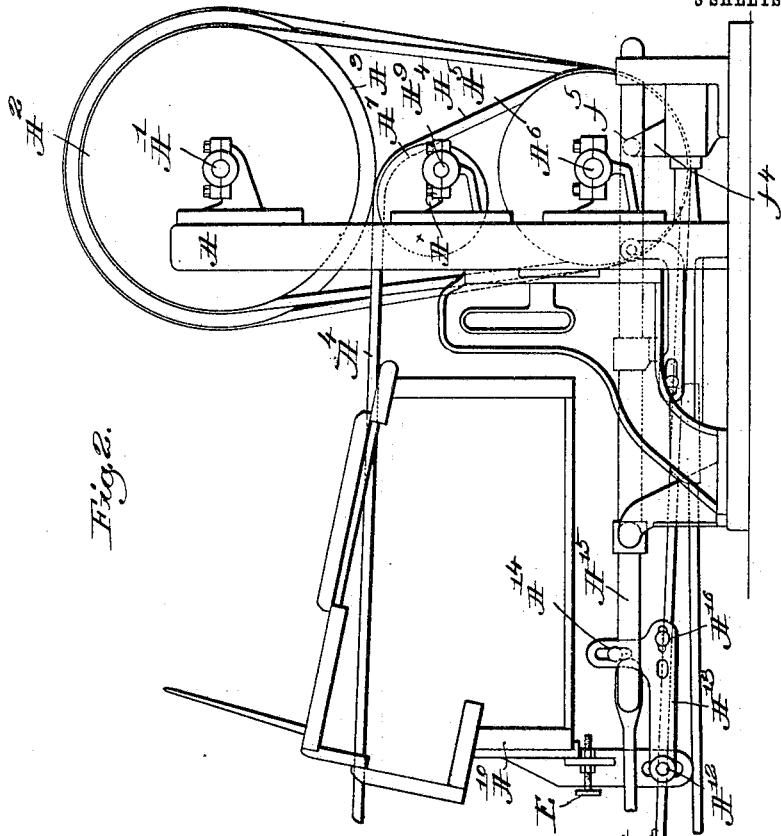
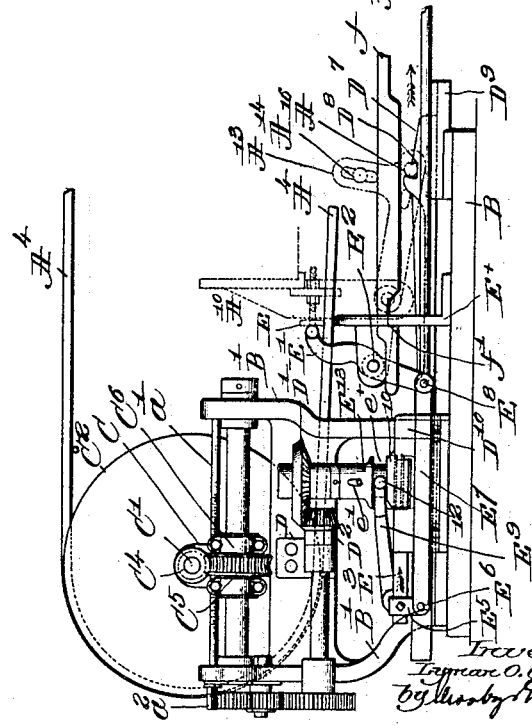

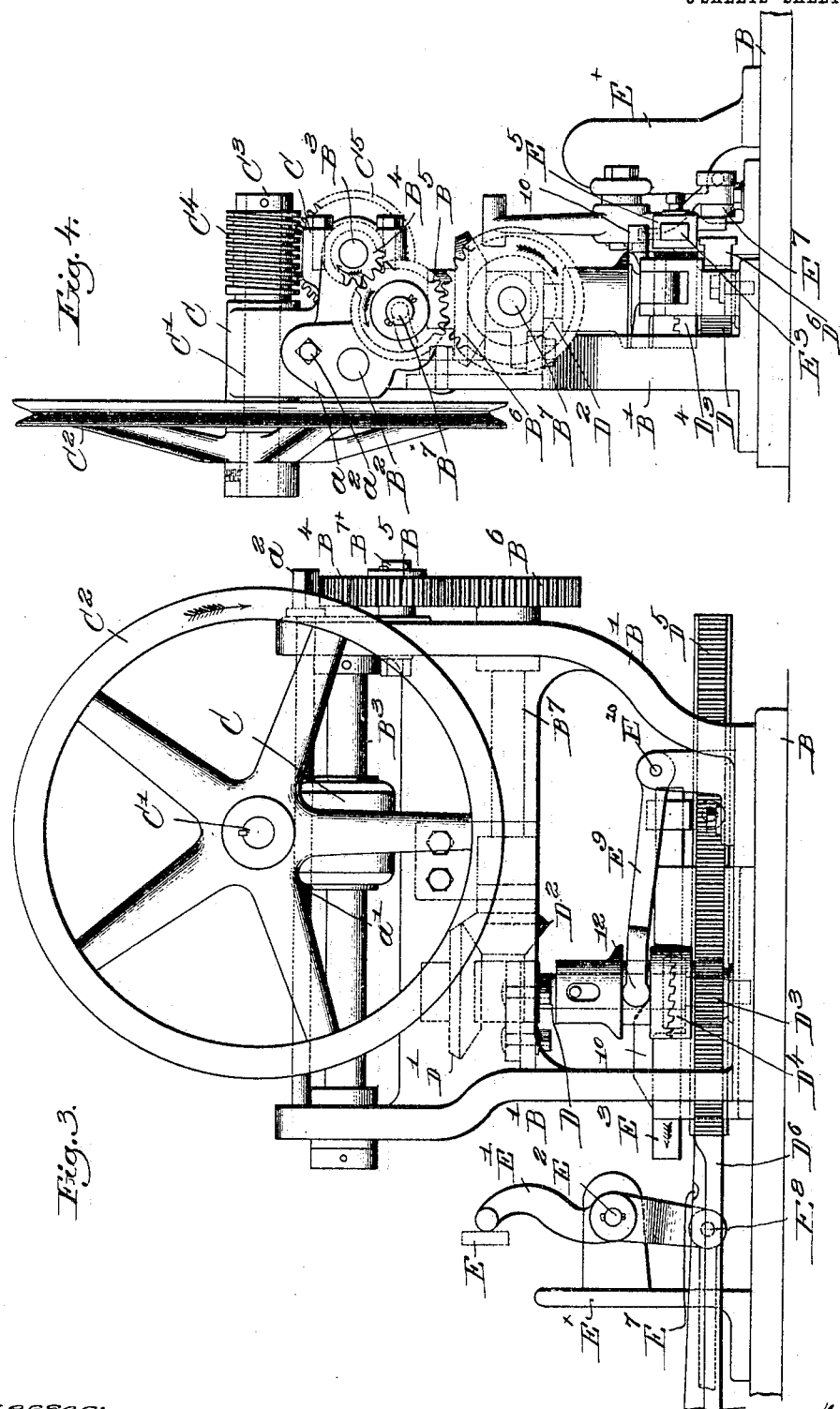

No. 781,822. PATENTED FEB. 7, 1905.
L. O. GOODWIN.
MULE.
APPLICATION FILED OCT. 15, 1903.
3 SHEETS—SHEET 3.
Fig. 5.
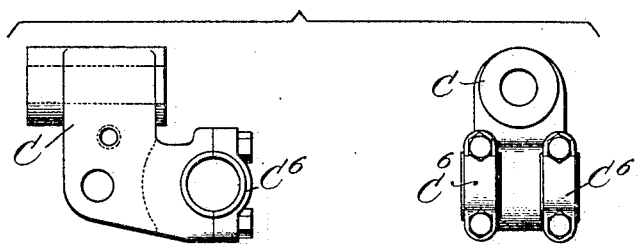
Fig. 6.
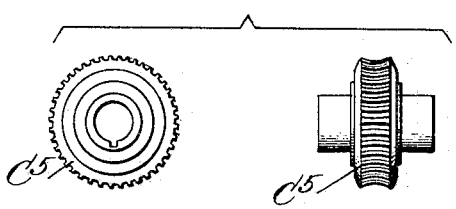
Fig. 7.
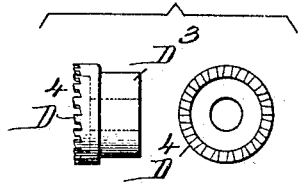
Fig. 8.
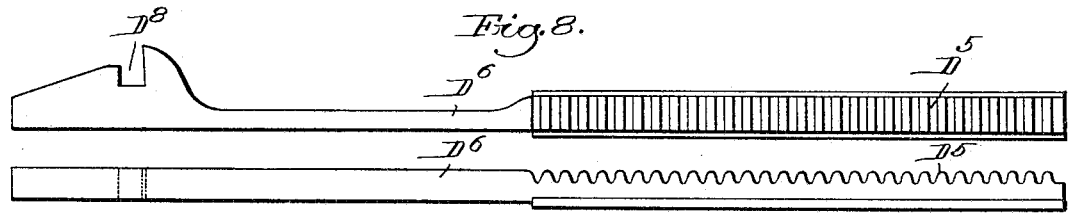
Fig. 13.
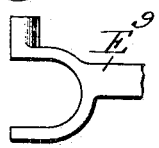
Fig. 9.
Fig. 10.
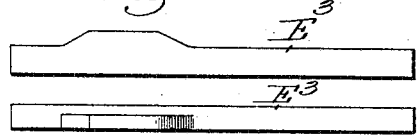
Fig. 11.
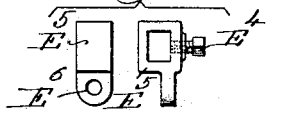
Fig. 12.
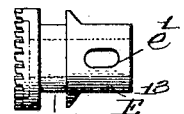
Witnesses:
Fred S. Greenleaf
M. C. Lunsford
Inventor.
Lyman O. Goodwin,
by Crosby Gregory
Attys.

No. 781,822.                                         Patented February 7, 1905.

UNITED STATES PATENT OFFICE.

LYMAN O. GOODWIN, OF NORTH ANDOVER, MASSACHUSETTS, ASSIGNOR TO DAVIS & FURBER MACHINE COMPANY, OF NORTH ANDOVER, MASSACHUSETTS, A CORPORATION OF MASSACHUSETTS.

MULE.

SPECIFICATION forming part of Letters Patent No. 781,822, dated February 7, 1905.

Application filed October 15, 1903. Serial No. 177,148.

*To all whom it may concern:*

Be it known that I, LYMAN O. GOODWIN, a citizen of the United States, residing at North Andover, in the county of Essex and State of Massachusetts, have invented an Improvement in Mules, of which the following description, in connection with the accompanying drawings, is a specification, like letters on the drawings representing like parts.

This invention has for its object to improve and simplify the construction of self-acting mules, my invention being shown as applied to a mule of the class shown in United States Patent No. 113,784, dated April 18, 1871, and issued to Peter McGovern, and in United States Patent No. 272,401, issued February 20, 1883, in the name of E. A. Baldwin.

My improvements to be herein described are directed chiefly to the so-called "ease motion," which includes devices instrumental in starting the carriage and moving the same slowly for a short distance inwardly or toward the mule-head after the completion of the "draw," which draw is effected by the outward run of the carriage, the slow motion effected by the ease motion taking place while completing the twist and prior to winding the yarn on a spindle, cop, or bobbin, the slow inward movement of the carriage "easing up" on the yarn to compensate for the shortening of the yarn due to the twist. The extent of inward movement of the carriage due to the ease motion depends on the quality and fineness of yarn and the degree of twist.

Heretofore the chief parts of the ease-motion mechanism have been attached to the mule "head;" but in accordance with my improvements to be herein described I have changed the construction of the ease mechanism and have located it at the place where the outward movement of the carriage terminates, and I have prepared to actuate my ease motion by the rim-band driven in usual manner substantially continuously. I have mounted the driving-pulley of the ease motion so that it may be adjusted to take up any slack in the rim-band driving said pulley, and yet the worm on the shaft of said driving-pulley may remain in driving engagement with the clutch-shaft, carrying the slidable member of the clutch, which is closed automatically when the ease motion is made operative to move the carriage.

To adapt a mule to different qualities and sizes of yarn and to varying degrees of twist in the yarn, it is necessary to be able to change the speed of the clutch-shaft for starting the ease motion to thereby control the speed at which the carriage may be moved inwardly while completing the twist. This is effected in the present case by a train of change-gears intermediate the longitudinal shaft carrying the worm-gear referred to and the short shaft for rotating the clutch-shaft.

The extent of inward movement of the carriage when under the control of the ease-motion mechanism is determined by or through the twist-slide or carriage of any usual twist motion, and the ease-motion mechanism having moved the carriage inwardly for the desired distance the carriage is disengaged automatically from the rack referred to and the ease-motion lever common to mules is (at the end of the inward motion) put into its normal position to be reëngaged and moved at the completion of the next outward movement of the carriage. The carriage is started inwardly at speed to wind the yarn in usual manner and by any usual mechanism, not necessary to be herein described, but which may be common to the McGovern or other self-acting mule.

In the drawings, Figures 1 and 2 taken together represent a side elevation of the chief parts of a self-acting mule to which my invention has been applied. Fig. 3 is a view, enlarged, of the stand located at the outer end of the run of the carriage, said figure showing the opposite side of the parts shown in Fig. 1. Fig. 4 is a right-hand end view of Fig. 3. Fig. 5 shows two views of the sliding bearing C detached. Fig. 6 shows two views of the worm-gear detached. Fig. 7 shows a side and end view of the clutch part and pinion $D^3 D^4$. Fig. 8 shows a side elevation and under side view of the slide-bar $D^6$ detached. Fig. 9 shows a side elevation and end view of the stand $D^{10}$ detached. Fig. 10 shows a side elevation and plan of the cam-bar $E^3$ detached. Fig. 11 shows two views of the dog $E^5$ detached, and Fig. 12 shows the clutch-sleeve $E^{13}$. Fig. 13 shows in plan the forked end of lever $E^9$.

Referring to the drawings, A represents part of the framework of the usual head of the mule, A' the power-shaft that may be rotated in any usual way to drive the actuating parts of the mule, $A^2 A^3$ rim-wheels mounted in usual manner on said shaft, said pulley $A^2$ being known as the "slow-speed" pulley and the pulley $A^3$ as the "fast-speed" pulley. These pulleys drive the rim-band $A^4$, which is passed one or more times about the grooved periphery of each pulley. This rim-band is also extended over a sheave $A^5$, mounted loosely on the drawing-in shaft $A^6$, said sheave having in practice coacting with it in usual manner a "friction," so that the sheave at times accomplishes what is called the "backing-off" motion. The rim-band is also carried over a sheave $A^7$, mounted loosely on a stud $A^\times$. The scroll-shaft is designated $A^9$. The carriage $A^{10}$ has pivoted upon it at $A^{12}$ the "ease-up" dog $A^{13}$, it having an adjustable stud $A^{14}$, that normally is just above the latch-rod slide $A^{15}$. This dog has a second adjustable stud $A^{16}$, that may at times engage a notch of a slide-bar to be described.

The parts so far described are substantially such as common to the McGovern mule (represented in United States Patent No. 113,784, dated April 18, 1871) and other subsequent patents of the same inventor and said E. A. Baldwin. In the patents referred to the ease-motion mechanism was located in the head and comprised quite a large number of parts that had to be contained in a limited space. Herein in my efforts to simplify the mule I have by changes of construction dispensed with a number of parts in the ease motion and have located the new parts at the quadrant-stand at or near the outward run of the mule-carriage.

I will now describe my improvements relating to the ease-motion mechanism.

At the outer end of the run of the mule-carriage I have erected upon the usual quadrant-stand base B a stand B', sustaining a guide-rod $B^2$. The stand B' has suitable bearings to sustain a shaft $B^3$, having at its end outside said stand a pinion $B^4$, constituting one of a series of change-gears $B^5 B^6$. The change-gear $B^5$ is mounted on a stud $B^{7\times}$, adjustably sustained in the stand, and the larger gear $B^6$ is keyed on a shaft $B^7$. Ears $a$, extended upwardly from the stand B', (see Fig. 4,) sustain a screw $a'$, having its head $a^2$ shaped to receive a wrench or key by which to rotate the screw. This screw is free to be rotated, and the threads of the screw engage threads of a slidable bearing C, (see Figs. 3, 4, and 5,) that sustain a shaft C', upon which is fast the rim-band pulley $C^2$, said shaft having secured to it near one end by a suitable pin $C^3$ a worm $C^4$. This worm engages and rotates a worm-gear $C^5$, shown detached in Fig. 6 and keyed to the shaft $B^3$ by any suitable feather, so that said worm-gear may be moved longitudinally of the axis of said shaft. The hubs of the worm-gear are embraced by loops $C^6$ of the bearing C, so that when said bearing is moved longitudinally by the screw referred to the shaft carrying the rim-band will also be adjusted to take up and compensate for any slack in the rim-band, and, notwithstanding the adjustment of the shaft carrying the rim-band pulley, the worm-gear, actuated as described, is enabled to actuate the shaft $B^3$ always in the same manner whatever the position of the rim-band pulley.

It will be understood from the description so far detailed that the shaft $B^7$ is rotated whenever the rim-band is rotated and in one or the other direction, according to the direction of the motion of the rim-band, the motion of the rim-band being changed as provided for in the McGovern and Baldwin patents—i. e., when the carriage is moving outwardly the rim-band is moving in one direction, and when the backing off is taking place preparatory to "winding on" the rim-band is reversed to a slight extent, and the backing off having taken place and the carriage having been started forwardly by the case motion, as will be described, the motion of the rim-band pulley is again in the same direction that it had when the carriage was running out, but at a slower speed.

The stand B' has suitable bearings for sustaining what I shall designate as a "clutch-shaft" D, it occupying a vertical position and having fixed to its upper end a bevel-pinion D', that is in mesh continuously with a bevel-gear $D^2$ on the shaft $B^7$, constituting part of the mechanism for actuating the clutch-shaft. The shaft D at its lower end has applied to it loosely a gear $D^3$, the upper end of which is shaped and toothed, as at $D^4$, to constitute part of a clutch.

The gear $D^3$ is normally in engagement with teeth $D^5$, formed in one side of what I shall designate the "ease-motion slide-bar" $D^6$, provided at its opposite end (see Figs. 1 and 8) with an incline $D^7$ and a notch $D^8$. This slide-bar is guided by suitable stands, as $D^9 D^{10}$, the stand $D^{10}$ being shown detached in Fig. 9. The pin $A^{16}$ engages the notch $D^8$ and moves the slide-bar, with the carriage, for a short distance, as shown in part in Fig. 1, this motion of the slide-bar causing its teeth in engagement with the pinion $D^3$ to restore the clutch part $D^4$ into the position it should occupy when the clutch part $E^{13}$, to be described, is to start said clutch part and slide-bar to start the inward run of the carriage.

As the carriage is completing its outward run the projection E of the carriage (shown in full lines, Fig. 2, and by dotted lines, Fig. 1) meets the drawing-out clutch-lever E', pivoted at E², of an ear of a stand E×, and moves the upper end of said lever to the left, placing it in the position shown by full lines, Fig. 3.

The stand D¹⁰ sustains a cam-bar E³, (shown detached in Fig. 10,) having secured to it by a set-screw E⁴ a dog E⁵, (see Fig. 11,) having a stud E⁶, that receives over it a hole in a link E⁷, jointed at E⁸ to the lower end of the drawing-out clutch-lever, so that as the carriage completes its outward run the slide E³ is moved in the direction of the arrow thereon, Figs. 1 and 4, to remove the cam 10 of said slide from under a stud 12, carried by the forked end 13 of a lever E⁹, pivoted at E¹⁰, permitting the forked end of said lever standing in an annular groove $e^\times$ (see Figs. 1, 3, and 12) of a clutch-sleeve E¹³, loosely connected by a pin and slot $e\ e'$ (see Fig. 2) with the rotating clutch-shaft D, permitting said clutch-sleeve provided at its lower end with teeth E¹⁴ and constituting the second member of the ease-motion clutch to drop and engage the teeth D⁴ of its coacting clutch part and immediately start in motion the gear D³. As the gear D³ is started its teeth in engagement with the teeth of the slide-bar D⁶ immediately start said bar toward the head A in the direction of the arrow, Fig. 1, and inasmuch as the pin of the ease-up dog is yet in engagement with the notch of said bar the carriage will be started inwardly for a short distance. This first inward motion of the carriage, produced by means independent of those usually employed for running the carriage outwardly during the drawing of the yarn and for drawing in the carriage during winding, and which takes place immediately after drawing the yarn and during the twisting preparatory to winding on, is designated in mule phraseology as the "ease-up motion." This slow inward motion of the carriage compensates for the shortening of the yarns due to the amount of twist put therein, and the twisting having been substantially completed the ease-up motion is disconnected from the carriage by lifting the ease-up dog, as will be described, and the carriage will be started quickly on its inward run to wind up the yarn.

It is necessary in the production of yarn that the speed at which the ease-up-motion mechanism acts to move the carriage inwardly should vary according to the quality of stock and the amount of twist, and I provide for this change of speed by or through a change of the intermediate gear B⁶. By changing the position of the ease-motion mechanism and locating the same at the outer run of the carriage I am enabled to dispense with the long rod usually extended from the front of the head backwardly, and I am also enabled to dispense with a lever which is usually attached to the floor and with which parts of the rod are adjustably connected, the adjustment of the rod to the lever providing for changes of speed during the inward run of the carriage when the ease-up motion mechanism is operated.

The ease-up dog in practice has connected with it a rod that is operatively joined with a rocker-shaft in the mule-carriage, said rocker-shaft being common to the McGovern and Baldwin mules, and on being turned lifts said dog and frees it from the notch D⁸ just as the backing-off friction is disengaged and the drawing-in clutch is engaged with the drawing-in shaft.

The latch-rod $f$, extended from the head of the mule backwardly through the stand E×, has a hook $f'$, that normally engages with said stand while the carriage is running out. Said latch near that end of it located at the head A has in practice an adjustable dog that meets the usual backing-off lever and moves it at the proper time to throw in the usual drawing-in clutch, substantially as in the McGovern mule.

Having described my invention, what I claim, and desire to secure by Letters Patent, is --

1. In a mule, a carriage, ease-up-motion mechanism including a pulley located at the outer end of the carriage traverse and driven by the rim-band, a rack normally out of engagement with the carriage, means to connect said rack with said carriage during the time the ease-up-motion mechanism controls the movement of the carriage, as when completing the twist prior to "winding on," means to actuate the driving member of the clutch of said ease-up-motion mechanism, and devices controlled by the latter as the carriage completes its outward run, to close said clutch and cause said rack to run the carriage inwardly while completing the twist.

2. In a mule, a carriage, a pulley located at the outer end of the traverse of the mule-carriage and driven by the usual rim-band, means normally out of engagement with the carriage, a rack, a clutch-shaft carrying part of a clutch and located at the outer end of the run of the carriage, means intermediate said pulley and said clutch-shaft for driving the same, including a train of change-gears for moving said clutch-shaft at a faster or slower speed according to the stock and the degree of twist therein, and devices controlled by the carriage as the latter completes its outward run to close said clutch and effect the starting of the carriage on its inward run at a slow speed while easing up on the yarn being twisted.

3. In a mule, a carriage having an ease-up dog, a pulley located at the outer end of the run of the mule-carriage, a clutch-shaft, devices actuated by said pulley to rotate said clutch-shaft, a coöperating clutch part, and means intermediate the same and actuated thereby to be engaged by said ease-up dog that the carriage when the clutch is engaged may be started inwardly as when easing up on the yarn.

4. In a mule, a shaft having a pulley located at the outer end of the traverse of the mule-carriage and driven by the rim-band, a clutch-shaft having mounted loosely thereon one member of a clutch, means actuated by the shaft carrying said pulley to rotate the clutch-shaft and its clutch part, a carriage, a coöperating clutch part surrounding said clutch-shaft loosely, means intermediate said coöperating clutch part and said carriage and adapted to be connected with said carriage at or near the completion of the draw-off during the outward run of the carriage, and means to couple the clutch parts of the clutch-shaft that the means intermediate said coöperating clutch parts and carriage may be started in their movement to start the carriage inwardly as when easing up on the yarn.

5. In a mule, a head, a carriage, a rack, ease-up-motion mechanism including a clutch-shaft having a clutch connected therewith to slide thereon, and a clutch part loose on said clutch-shaft and having an attached gear always in meshing contact with said rack, and means moved by said carriage as the latter completes its outward run to couple automatically said clutch parts to start said carriage inwardly at a slow speed.

6. In a mule, a head, a carriage, ease-motion mechanism including a shaft and clutch, and means intermediate said clutch-shaft and carriage and adapted to be coupled with the carriage while the ease-up motion is operated, and means including a pulley, shafts and change-gear to actuate the clutch-shaft of the ease-motion mechanism as the carriage completes its outward run, said means insuring the automatic coupling of the clutch parts that the clutch-shaft may start said carriage inwardly at a slow speed as described.

7. In a mule, a pulley located at the outer end of the run of the mule-carriage, a rim-band for rotating said pulley, a shaft sustaining said pulley and carrying a worm, a stand sustaining said worm-shaft, a longitudinal shaft having a worm-gear splined thereon and engaged with said worm, and means to adjust said stand, its pulley, worm-shaft and worm-gear, the latter moving the shaft carrying said pulley to thereby enable any slack in the rim-band to be taken up and yet enable said pulley to rotate the shaft carrying the worm-gear in any position of the worm-gear thereon.

In testimony whereof I have signed my name to this specification in the presence of two subscribing witnesses.

LYMAN O. GOODWIN.

Witnesses:
NEWTON P. FRYE,
SAMUEL F. ROCKWELL.